Sept. 11, 1923.

C. L. KENNEDY

BEARING

Filed Nov. 1, 1922

1,467,673

Witness:
Alfred H. McGlinchey.

Inventor:
Carlton L. Kennedy
by his attorneys

Patented Sept. 11, 1923.

1,467,673

UNITED STATES PATENT OFFICE.

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS.

BEARING.

Application filed November 1, 1922. Serial No. 598,319.

*To all whom it may concern:*

Be it known that I, CARLTON L. KENNEDY, a citizen of the United States, residing at Braintree, in the county of Norfolk and State of Massachusetts, have invented certain new and useful Improvements in Bearings; and I do hereby declare the following to be a full, clear, and exact description of the invention, such as will enable others skilled in the art to which it appertains to make and use the same.

This invention relates to a bearing for motor shafts and the like.

The object of the invention is to provide a self-oiling bearing for motor shafts and the like of novel and improved construction and which is adapted to function efficiently without oil leakage irrespective of the position of the shaft.

With this object in view, the invention consists in the bearing hereinafter described and particularly defined in the claims.

Figure 1:
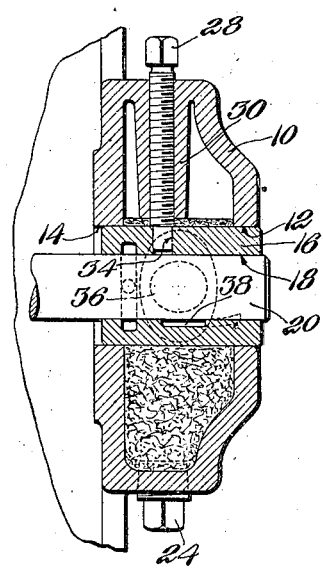
Figure 2:
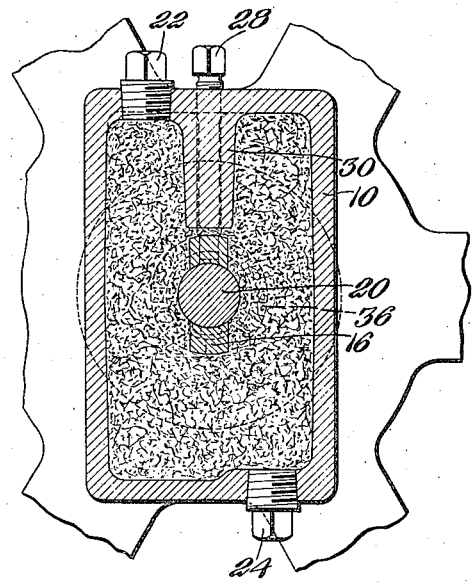
Figure 3:
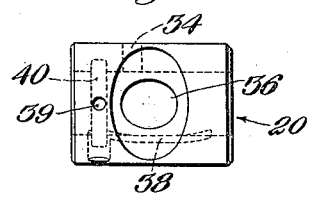
Figure 4:
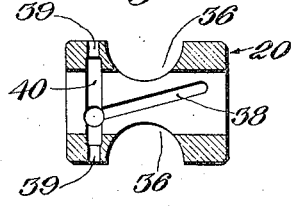

In the drawing illustrating the preferred embodiment of the invention, Fig. 1 is a vertical longitudinal section of the bearing; Fig. 2 is a cross-section of the same; Fig. 3 is a plan of the bearing block; and Fig. 4 is a longitudinal section of the same.

In all prior constructions of self-oiling bearings of which I am aware, considerably more than the requisite amount of oil for lubrication is applied to the shaft with the result that considerable leakage of the oil takes place between the bearing surface itself and the end of the shaft. This difficulty is experienced particularly when the shaft is located in a vertical position, the oil tending to flow by gravity downwardly between the bearing surface and the end of the shaft. For certain purposes it is desirable to provide a self-oiling bearing which is adapted to run for long periods of time without attention and without replenishment of the oil. Thus, for example, in player pianos in which the motor is incorporated in the piano when the latter is built, it is the usual custom to supply the bearing for the motor shaft with sufficient lubricant to last for the life of the instrument. Difficulty has been experienced in these player pianos in that gradual leakage of the oil takes place resulting eventually in insufficient lubrication of the motor shaft. In grand pianos in which the motor shaft is arranged vertically, the oil leakage between the motor shaft and its bearing presents a more serious difficulty than in the upright pianos in which the motor shaft is arranged horizontally. In both instances, however, difficulty has been experienced because of oil leakage. The present invention contemplates a construction of bearing which is self-oiling and which may be used in any position without liability of oil leakage.

In the drawing, the illustrated construction of bearing comprises a bearing housing 10 provided with aligned openings 12, 14 into which the bearing block 16 is fitted. The bearing block 16 has a cylindrical bearing surface 18 in which the motor or similar shaft 20 is journaled. The bearing housing 10 comprises a reservoir in which oil and preferably wool waste saturated with oil is received. Two plugs 22, 24 are provided in the housing 10 to permit the introduction of the wool waste and the oil. The bearing block 16 is held from rotation and also from longitudinal movement by a set screw 28 screwed down through a boss 30 extended downwardly toward the bearing as illustrated in Figs. 1 and 2. The end of the set screw is received within a hole 34 in the bearing block. The housing 10 serves therefore as an oil reservoir.

In order to insure the proper lubrication of the shaft 20 and of the bearing surface 18 in which it is journaled, and at the same time to insure against leakage of oil between the shaft and the bearing surface, openings 36 are provided in the bearing block to provide access of oil to the surface of the shaft and an oil groove 38 is arranged in the bearing in such position with respect to the rotation of the motor shaft 20, as to cause the surplus oil supplied through one of the openings to flow through the oil groove and to be delivered into an oil passage 40 from which it may be returned to the reservoir. Both the openings and the groove are arranged at some distance from each of the ends of the bearing surface 18 so that the end portions of the bearing surface are supplied with only sufficient oil to insure proper lubrication, the surplus oil being controlled in its flow by the oil groove and returned again to the oil reservoir. In this manner oil leakage along the shaft and between it and the bearing surface is prevented thus enabling the normal supply of oil within the reservoir to properly lubricate the bearing for long periods of time. The advantages of a bearing of this construction for uses such as piano players are obvious.

In the illustrated construction, the openings comprise the cutaway portions 36 in the central portion of the bearing block, which allow the oily wool waste to apply to the surface of the shaft. In this manner oil is supplied for the lubrication of the shaft and its bearing surface. The oil passage 40 is an annular recess in the inside of the bearing and it is provided with holes 39 communicating with the oil reservoir. The oil groove 38 in the bearing surface is so located in its direction of extension with respect to the rotation of the shaft 20 that by means of the friction between the shaft and the oil collected in the groove, the oil is carried along the groove into the annular passage or recess 40 and from which any excess flows out through the holes 39 into the housing. It will be observed that the openings 36, comprising the cutaway portions and the annular recess 40, as well as the groove 38 itself in the bearing surface, terminate some distance from the ends of the bearing surface so that the extreme portions of the bearing surface, while provided with sufficient lubicant to insure efficient operaion, are never supplied with surplus lubricant whereby the usual leakage of oil between the shaft and the bearing is prevented.

While the preferred embodiment of the invention has been illustrated and described, it is to be understood that the invention may be embodied in other forms within the scope of the following claims.

Having thus described the invention, what is claimed is:

1. A self-oiling bearing for motor shafts and the like comprising a bearing block, a housing embracing the bearing block and constituting an oil reservoir, two oil passages in the bearing block spaced apart, and a longitudinal oil groove in the bearing surface of the bearing block, the oil passages and oil groove being all located at some distance from both ends of the bearing surface and the longitudinal oil groove being arranged with respect to the direction of rotation of the shaft to collect the surplus oil as it is supplied to the shaft through one of the oil passages and to permit it to be returned by the rotation of the shaft through the oil groove and the second passage into the oil reservoir.

2. A self-oiling bearing for motor shafts and the like comprising a bearing block, a housing embracing the bearing block and constituting an oil reservoir, a centrally located cutaway portion of the bearing block for permitting access of oil to the shaft, an oil groove in the bearing surface, an annular recess in which the oil groove terminates, located between the cutaway portion and one end of the bearing surface and a hole communicating with the interior of the housing and with the annular recess, the oil groove being arranged at such angle with respect to the direction of rotation of the shaft as to cause surplus oil collected in the oil groove to flow into the recess and thence through the opening back into the oil reservoir.

CARLTON L. KENNEDY.